US00RE33953E

United States Patent [19]

Everts

[11] E Patent Number: Re. 33,953

[45] Reissued Date of Patent: Jun. 9, 1992

[54] FILING MODULE

[76] Inventor: Kenneth A. Everts, 15 Willow St., Westwood, Mass. 02090

[21] Appl. No.: 307,759

[22] Filed: Feb. 7, 1989

Related U.S. Patent Documents

Reissue of:

[64] Patent No.: 4,717,215
Issued: Jan. 5, 1988
Appl. No.: 934,175
Filed: Nov. 20, 1986

[51] Int. Cl.[5] ..... A47B 63/00

[52] U.S. Cl. ..... 312/184; 312/185

[58] Field of Search ..... 312/184, 183, 185, 186, 312/187, 188

[56] References Cited

U.S. PATENT DOCUMENTS

| | | | |
|---|---|---|---|
| 1,259,659 | 3/1918 | Myers | 312/184 |
| 3,281,193 | 10/1966 | Murray | 312/184 |
| 3,363,954 | 1/1968 | Brungardt et al. | 312/184 |
| 3,753,606 | 8/1973 | Ozeki | 312/183 |
| 3,788,718 | 1/1974 | Bjorn et al. | 312/184 |
| 3,971,502 | 7/1976 | Grundell | 312/184 |
| 4,103,980 | 8/1978 | Silva | 312/185 |
| 4,234,238 | 11/1980 | Figueroa | 312/184 |
| 4,325,595 | 4/1982 | Solomon | 312/183 |
| 4,526,277 | 7/1985 | Snowden et al. | 211/46 |
| 4,530,176 | 7/1985 | Rejwan | 312/184 |

FOREIGN PATENT DOCUMENTS

| | | | |
|---|---|---|---|
| 1203730 | 10/1965 | Fed. Rep. of Germany | 312/184 |
| 1150459 | 1/1958 | France | 312/184 |
| 1276212 | 10/1961 | France | |
| 2382343 | 11/1978 | France | 312/183 |
| 2396657 | 3/1979 | France | 312/185 |
| 619391 | 3/1949 | United Kingdom | |
| 914081 | 12/1962 | United Kingdom | 312/184 |
| 2123347 | 2/1984 | United Kingdom | 312/183 |

OTHER PUBLICATIONS

Brochure Re W. T. Rogers, Folder Rack and Crate-A-File (4 sheets), date unknown.

Pendaflex Catalog A, "Speed Filing Systems" (12 sheets), 1984.

Oxford "McFile" Brochure (2 sheets), date unknown.

Oxford "Decoflex" (2 sheets), date unknown.

Oxford unidentified catalog sheets (5 Sheets), date unknown.

Sentry "Fire-Safe Security File" (2 sheets), 1986.

Unidentified catalog sheets (5 sheets), date unknown.

*Primary Examiner*—Victor N. Sakran

*Attorney, Agent, or Firm*—Wolf, Greenfield & Sacks

[57] ABSTRACT

A filing module includes a box of relatively rigid material, projections extending outwardly from upper portions of front and rear panels of the box and a pair of parallel rods secured to corresponding projections on the front and rear panels. The parallel rods are spaced to support hanging folders and function as carrying handles. A cover is hinged to the box by one of the rods and can be locked for security. The filing module can be placed in a standard file drawer or can be used independently. In one embodiment, a second pair of parallel rods is secured between end panels of the box to provide support for legal size hanging folders.

30 Claims, 5 Drawing Sheets

Fig. 7
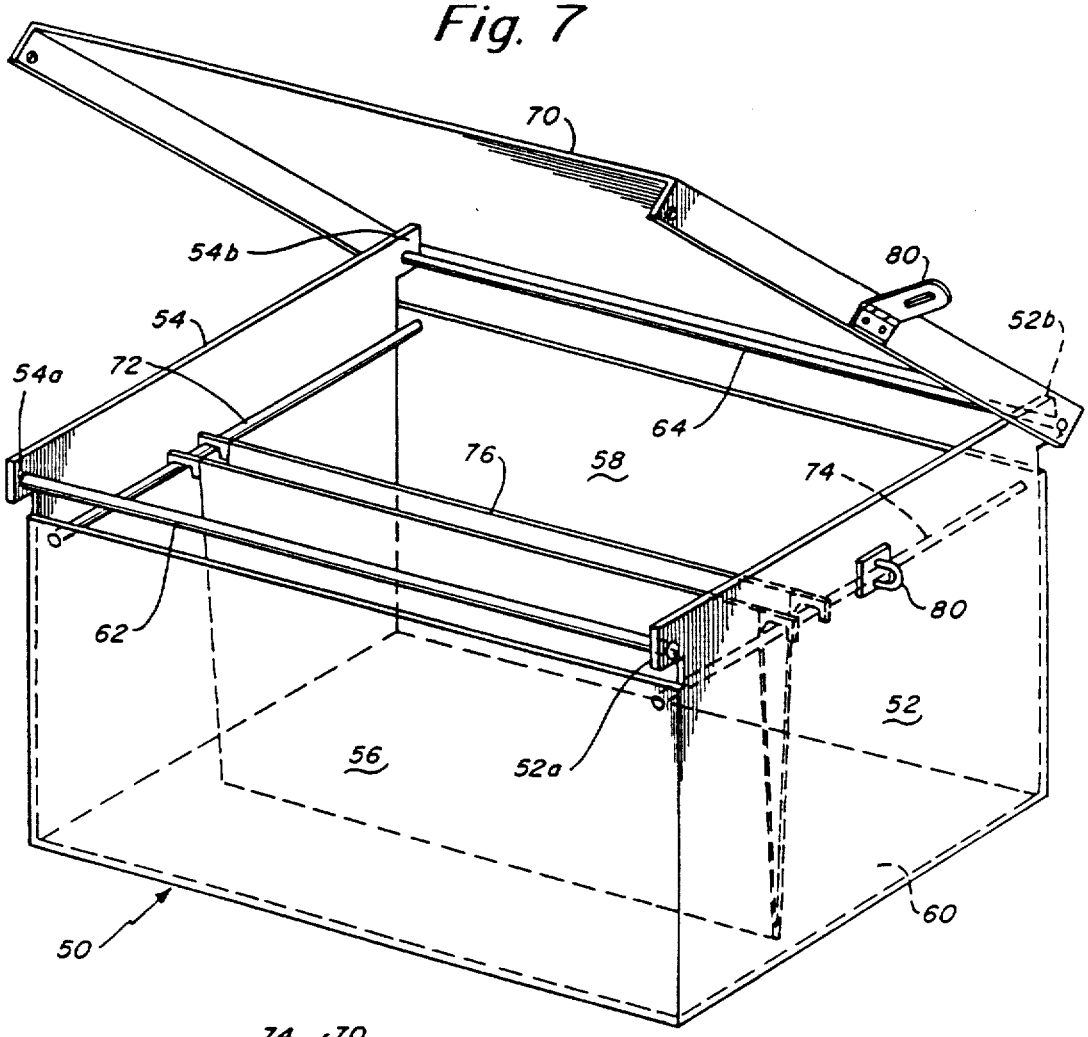
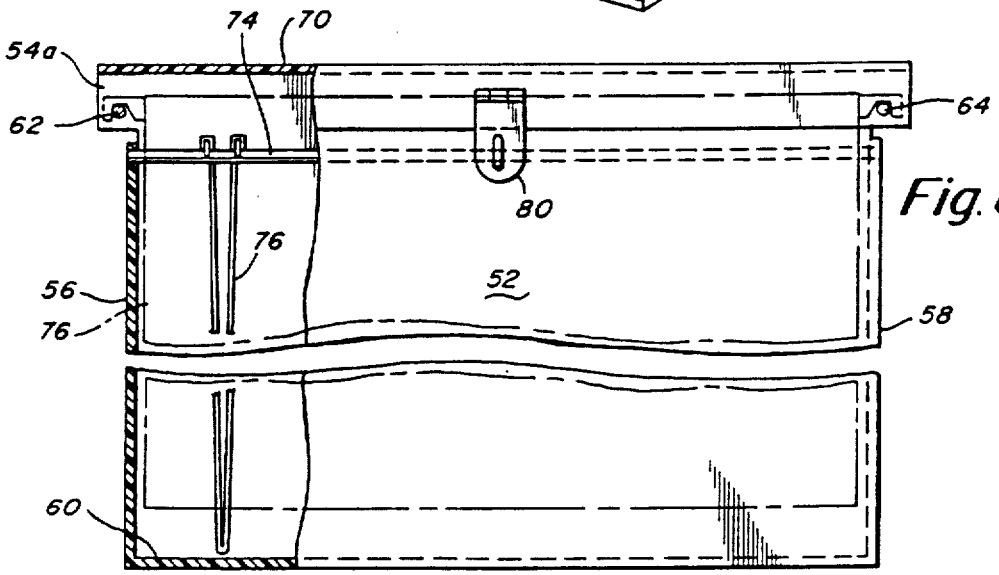
Fig. 8

FILING MODULE

Matter enclosed in heavy brackets [ ] appears in the original patent but forms no part of this reissue specification; matter printed in italics indicates the additions made by reissue.

FIELD OF THE INVENTION

This invention relates to filing modules and, more particularly, to filing modules for storing hanging files and other objects either in a file drawer or independently, for limiting access to materials stored in the filing modules and for transporting and organizing such materials.

BACKGROUND OF THE INVENTION

The components of standard suspension or hanging-type filing systems for the record-keeping of paper documents include a file cabinet having drawers of lateral or vertical files, desk drawers, file boxes, open shelves, file folders with open sides to hold paper documents and hanging folders to store the file folders. The hanging folders are suspended by hangers on a rail which is either an integral part of the cabinet structure or part of a separate frame insert. The folders hang above the bottom of the cabinet, allowing them to slide along the rail so as to provide back and forth access and to prevent the file folders contained therein from slumping, sagging or getting lost in the housing. Hanging folders may also be constructed as binders to house computer printouts, special folders to hold thin documents such as microfilm or computer disks, binders for fastening standard paper documents together or as a box bottom to hold bulky materials such as catalogs, magazines and notebook-type binders. The hanging folders usually include provision for tabs and inserts to identify the contents.

A suspension or hanging-type file system does not permit storage and organization of hanging folders as a collective subject grouping which can be retrieved or transferred as an integral unit. For example, a particular project or case may have numerous related file folders. In addition, suspension file systems do not easily accommodate mixing of file folders with nonpaper objects (sample items, criminal evidence and the like). Suspension file systems also do not provide for the security and control of selected folders or groups of folders within the same cabinet, so that access is permitted to some files but not to others. The materials used in the construction of hanging folders do not lend themselves to insuring locked privacy.

Various racks and cases have been used for handling and storage of hanging folders. File boxes having locking covers and carrying handles are known for transporting hanging folders. Such file cases are not adapted for storage in filing cabinets. Therefore, files must be transferred back and forth between the file case and filing cabinets. File racks adapted for temporarily storing hanging folders on desk tops or in file drawers are also known. Such racks do not provide any means for security nor are they well suited for storing items other than hanging folders.

It is a general object of the present invention to provide improved filing modules.

It is another object of the present invention to provide removable filing modules for storing hanging folders and other objects in conventional file drawers having side rails.

It is a further object of the present invention to provide filing modules wherein groups of hanging file folders and other objects can be stored in a file drawer in a secure manner.

It is a further object of the present invention to provide filing modules capable of storing hanging folders of two different sizes.

It is yet another object of the present invention to provide filing modules which permit storing of groups of related hanging folders in a file drawer and which permit easy removal and transfer of such groups of files.

SUMMARY OF THE INVENTION

According to the present invention, these and other objects and advantages are achieved in a filing module comprising a box having a bottom panel, a front panel, a back panel and two end panels, upper portions of the front panel and the back panel extending outwardly beyond each of the end panels to define projections. The filing module further comprises a first pair of parallel rods extending between corresponding projections on the front panel and the back panel and spaced to provide supports for hanging folders of a first specified size, and a cover hinged to the front panel and the rear panel by one of the rods for pivoting movement. The filing module is sized and shaped for placement in a standard file drawer dimensioned for receiving hanging folders of the specified size.

In a preferred embodiment, the projections on the filing module have lower edges sized to rest on conventional side rails for hanging folders in the file drawer. Preferably, the end panels terminate below the lower edges of the projections, thereby permitting the parallel rods to be used for lifting the filing module. The filing module can be provided with means for locking the cover.

According to another aspect of the invention, the filing module further includes a second pair of parallel rods extending between the end panels and spaced apart to provide supports for hanging folders of a second specified size. This configuration can store either standard size hanging folders or legal size hanging folders.

BRIEF DESCRIPTION OF THE DRAWINGS

For a better understanding of the present invention, together with other and further objects, advantages and capabilities thereof, reference is made to the accompanying drawings which are incorporated herein by reference and in which:

FIG. 7 is a perspective view of a legal size filing module in accordance with the present invention;

FIG. 8 is a front view, partially cut away, of the legal size filing module of FIG. 7.

DETAILED DESCRIPTION OF THE INVENTION

Figure 1:
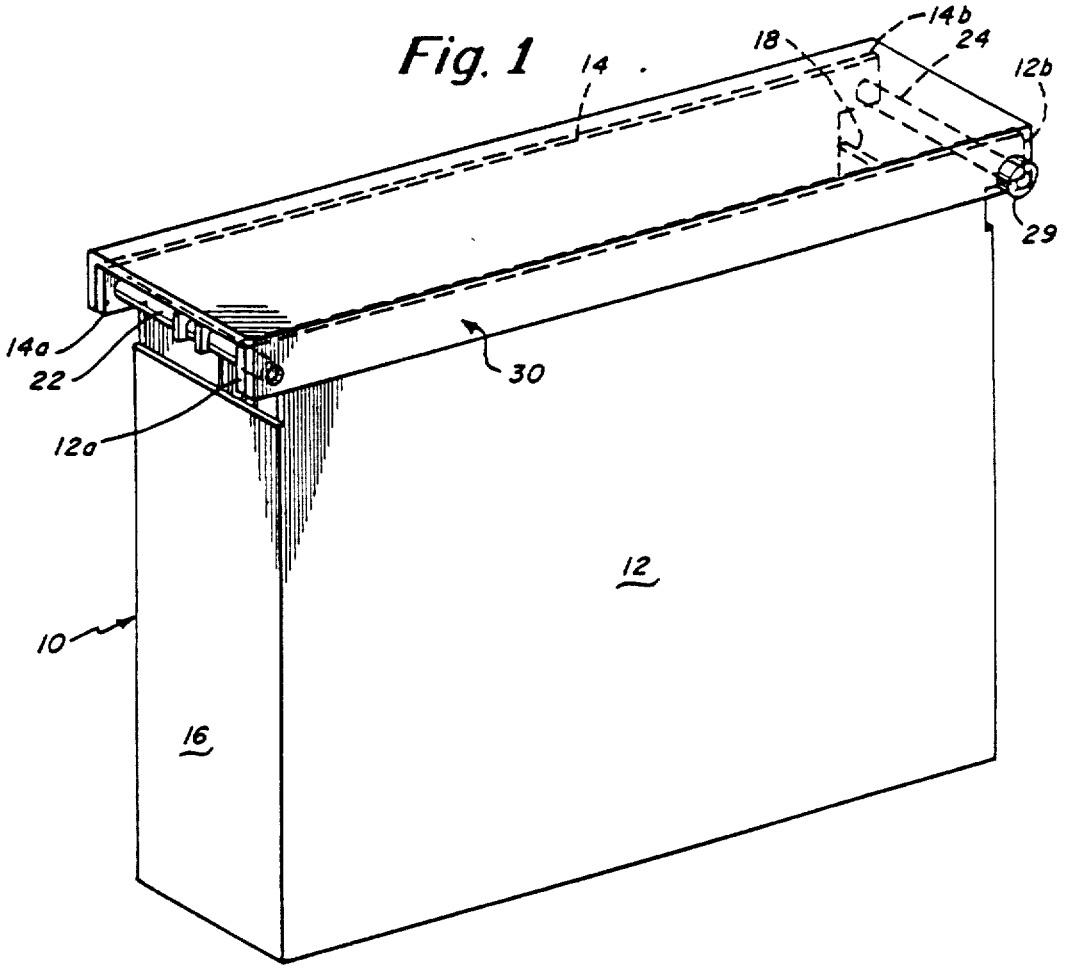
FIG. 1 is a perspective view of a small filing module in accordance with the present invention.
Figure 2:
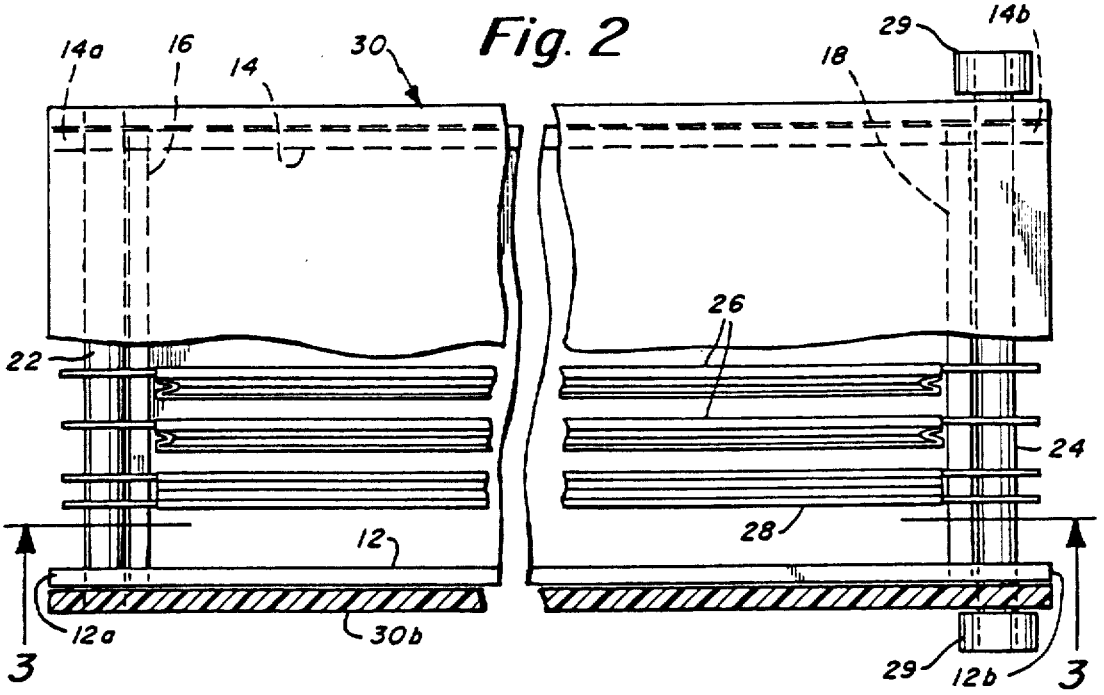
FIG. 2 is a top plan view of the filing module of FIG. 1, partially broken away to show storage of file folders.

A filing module in accordance with a preferred embodiment of the present invention is shown in FIGS. 1–4. A rectangular box 10 is defined by a front panel 12, a back panel 14, end panels 16, 18 joining from panel 12 and back panel 14, and a bottom panel 20. The filing module also includes rods 22, 24 for retaining hanging folders 26, 28 within the box 10 and a hinged cover 30. The filing module will now be described in detail.

The panels 12, 14, 16, 18, 20 can be formed of any relatively rigid material, such as plastic, cardboard or the like and may be opaque or transparent. Individual panels joined at their edges by an adhesive may be used, or an integrally formed box 10 may be utilized. The relatively rigid material of the box 10 provides security when the module is locked, protects the files against damage, and permits storage of non-paper objects.

Figure 3:
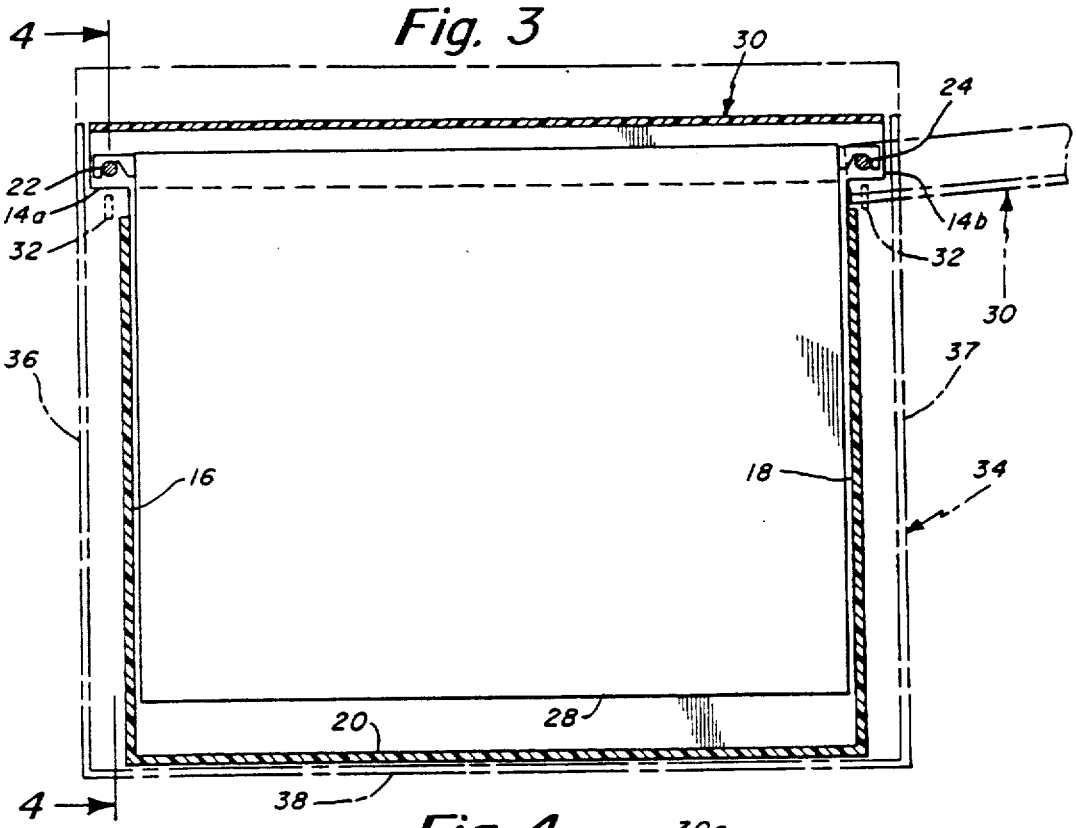
FIG. 3 is a cross-sectional view of the filing module taken through the line 3—3 of FIG. 2, with the cover shown in phantom in an open position.

Front panel 12 includes projections 12a, 12b extending outwardly from the upper portion thereof beyond end panels 16, 18, respectively. The back panel 14 is provided with projections 14a, 14b extending outwardly from the upper portion thereof beyond end panels 16, 18, respectively. The projections 12a, 12b, 14a, 14b are preferably rectangular and are dimensioned and shaped to rest on conventional hanging file rails 32, as shown in FIG. 3, when the filing module is placed in a filing drawer 34.

Figure 4:
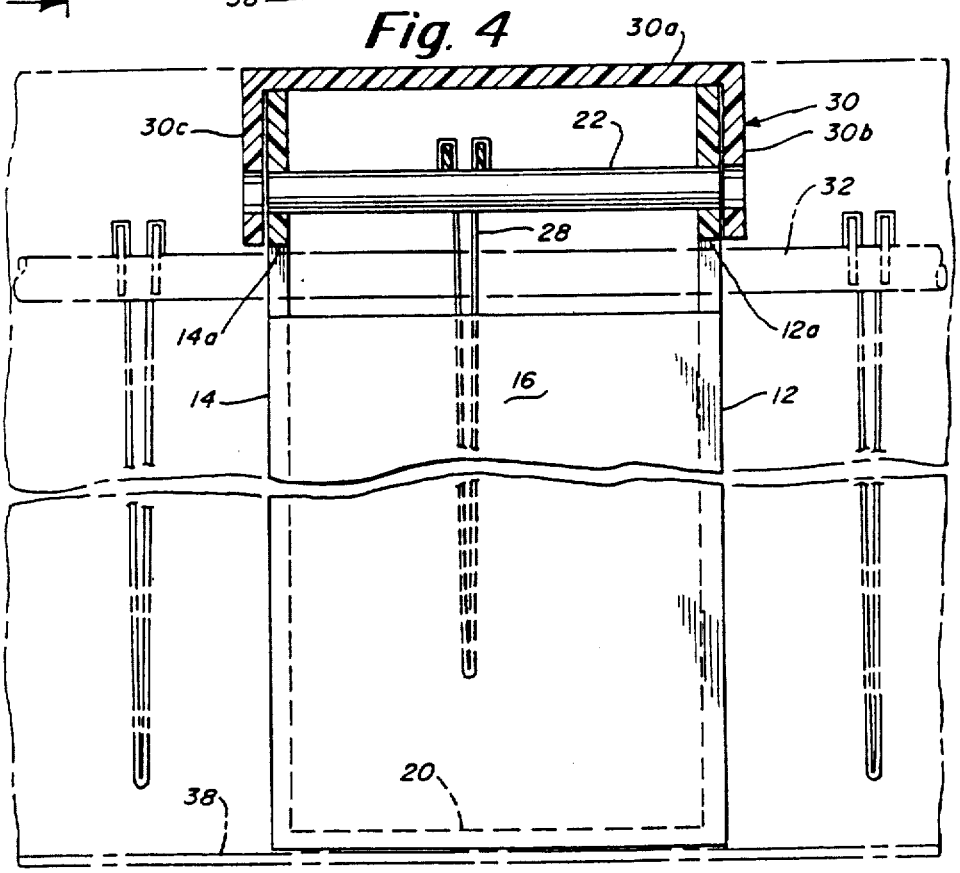
FIG. 4 is a cross-sectional view of the filing module taken through the line 4—4 of FIG. 3 with a portion of a file drawer shown in phantom.

The projections 12a and 14a, adjacent end panel 16, have aligned holes in which rod 22 is secured. Similarly, projections 12b and 14b, adjacent end panel 18, have aligned holes in which rod 24 is secured. The rods 22, 24 are parallel and are spaced to accommodate hanging folders 26, 28 of a specified size such as standard size or legal size. The rods 22, 24 are secured permanently in the respective projections 12a, 12b, 14a, 14b by adhesive or any other suitable means. In the example of FIGS. 1–4, the rod 24 is secured by retaining knobs 29 at each end thereof. As seen in FIG. 4, the ends of rod 22 are flush with the front panel 12 and the rear panel 14 to permit the cover 30 to be closed.

The cover 30 includes a generally flat top portion 30a and downwardly extending flanges 30b, 30c along the front and rear edges, respectively, of top portion 30a to form an inverted channel. One of the rods 22 or 24 has a length greater than the width of the box 10 so that the ends thereof pass through aligned holes in the cover 30. Thus, the cover 30 can pivot about the rod to which it is attached. In the example of FIG. 3, cover 30 is pivoted about rod 24 and is shown in phantom in the open position.

The rods 22, 24 mounted in the outwardly extending projections 12a, 12b, 14a, 14b are conveniently used as carrying handles for the filing module. To facilitate use of the rods 22, 24 as carrying handles, the end panels 16, 18 are terminated below the lower edges of the projections 12a, 12b, 14a, 14b. The cut out portions insure easy access by the hand of a person carrying the filing modules.

The filing module is shown in file drawer 34 in FIGS. 3 and 4. The file drawer 34 is of standard design with sides 36, 37, bottom 38, front and rear (not shown) and rails 32, and can be located in a front opening file cabinet or a side opening file cabinet. The rails 32 are used in a standard file drawer to support handling folders. The filing module of the present invention is sized and shaped to fit within the file drawer, as clearly seen in FIGS. 3 and 4, with the projections 12a, 12b, 14a, 14b resting on the rails 32. Alternatively, in file drawers not having rails, the filing module can rest on the bottom 38 of the file drawer. The dimension of the filing module in the direction of rods 22, 24 is usually much less than the depth of the file drawer 34. However, in the case of a legal size filing module, as shown in FIG. 6 and described hereinafter, the filing module can occupy a substantial proportion of the file drawer.

Figure 5:
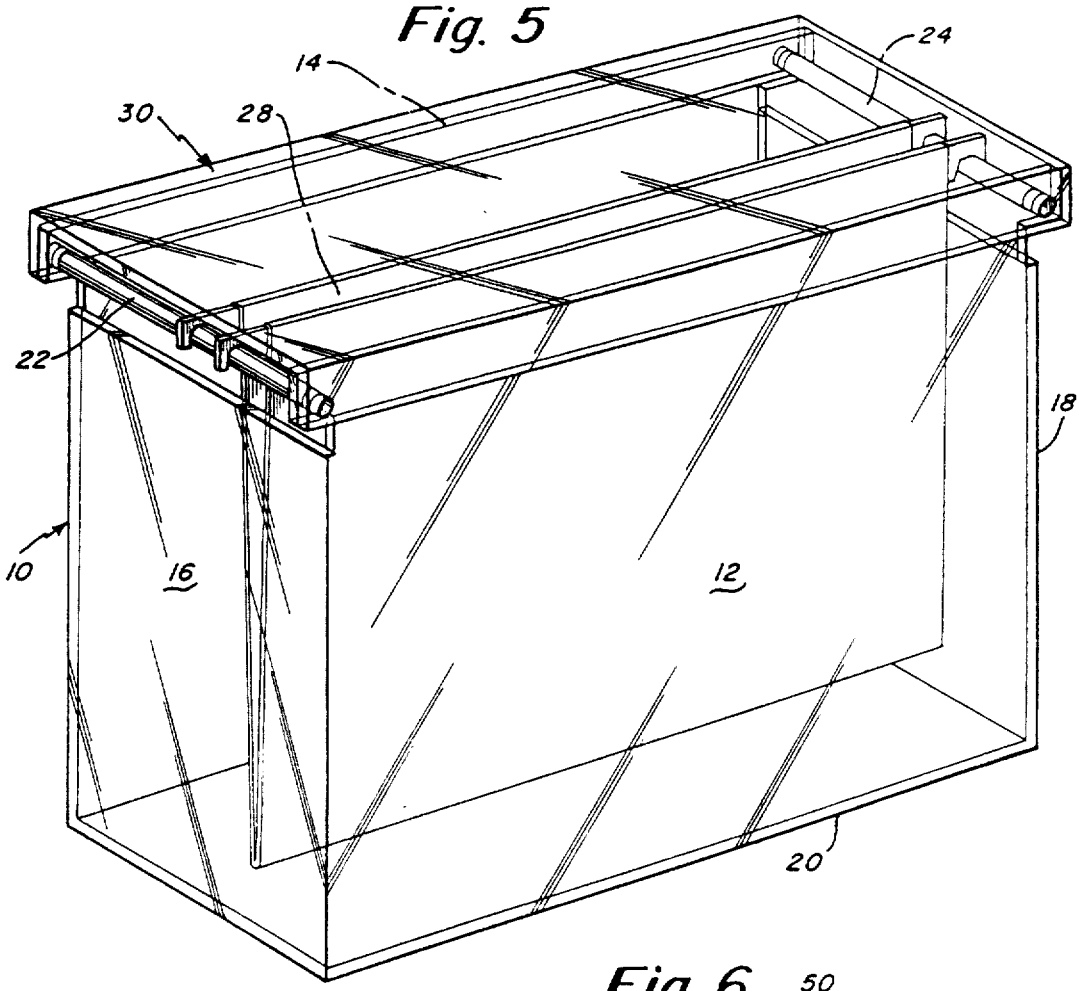
FIG. 5 is a perspective view of an intermediate size filing module in accordance with the present invention.

FIG. 5 illustates an embodiment of the present invention having larger dimensions than the embodiment of FIGS. 1–4 and made of a transparent material to permit viewing of the files or other materials contained in the filing module. Elements designated by the same reference numerals used in FIGS. 1–4 have the same general construction as described hereinabove, except these elements may have different dimensions.

A filing module in accordance with another embodiment of the present invention is shown in FIGS. 6–9. In this embodiment, the filing module is elongated to permit storage of hanging folders of two different sizes at different times. The filing module includes a box 50 defined by a front panel 52, a back panel 54, end-panels 56, 58 and a bottom panel 60. A rod 62 extends between a projection 52a in front panel 52 and a projection 54a in back panel 54. A rod 64 extends between a projection 52b in front panel 52 and a projection 54b in back panel 54. A cover 0, having a generally flat top portion and downwardly extending flanges along its front and rear edges, is hinged to the box 50 so as to pivot about rod 64. The filing module is further provided with a second pair of parallel rods 72, 74 extending between the end panels 56, 58 and spaced apart to provide supports for hanging folders 76 of a different size than can be supported by rods 62, 64. Typically, the rods 72, 74 are spaced for legal size folders while the rods 62, 64 are spaced for standard size folders. However, it will be understood that each pair of rods can be spaced to accommodate any desired size hanging folder. Although the filing module shown in FIGS. 6–9 can accommodate two different size folders, it can accommodate only one size folder at a time, since the two different sizes are stored in perpendicular directions.

Figure 6:
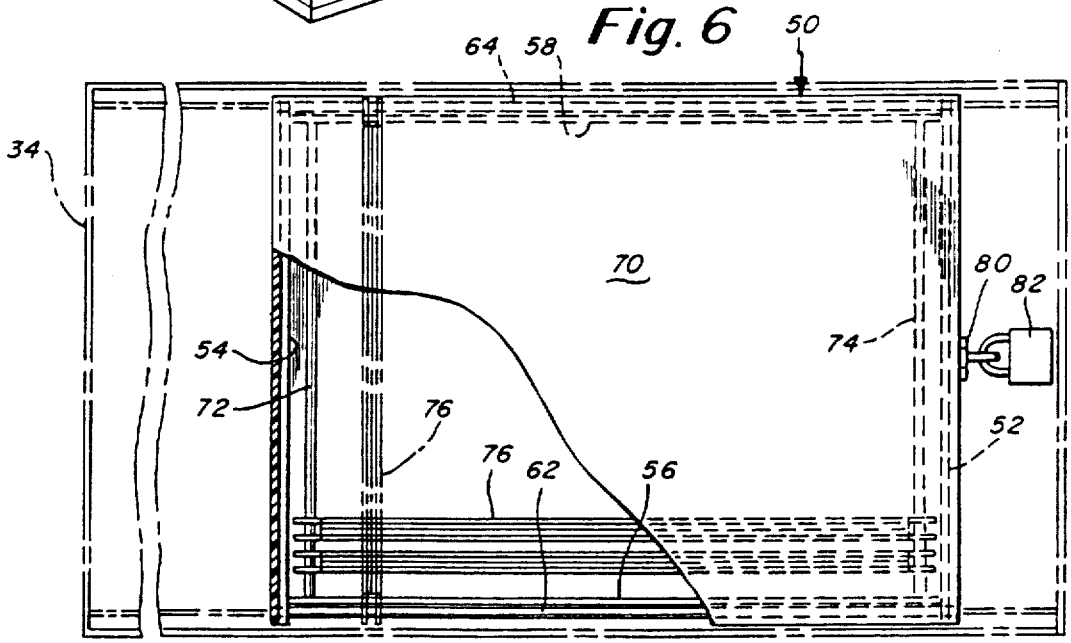
FIG. 6 is a top plan view, partially cutaway, of a legal size filing module in a filing drawer.
Figure 9:
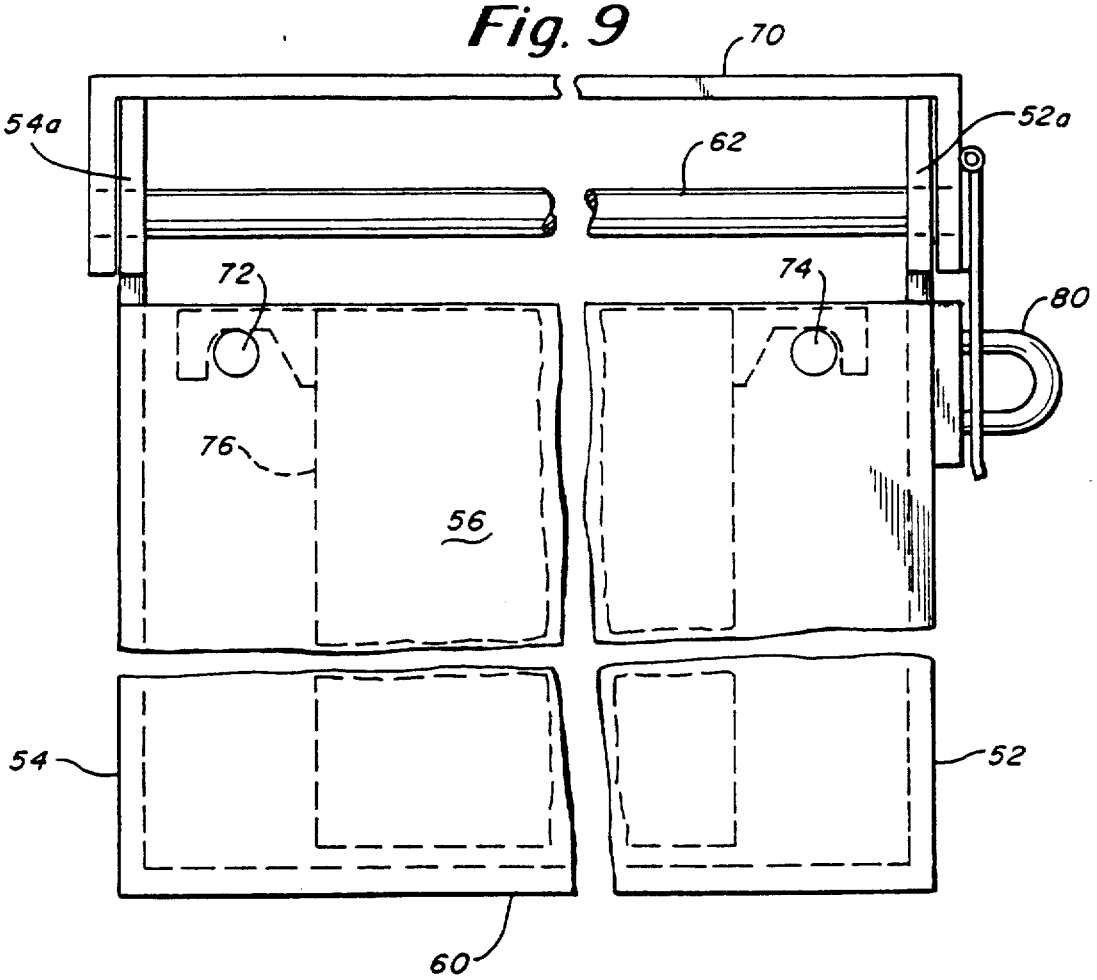
FIG. 9 is a side view of the legal size filing module shown in FIG. 7.

The embodiment of FIGS. 6–9 is provided with means for locking the cover in the form of a gasp 80 and padlock 82. The filing module can be placed in a filing drawer, as best seen in FIG. 6, with the projections 52a, 52b, 54a, 54b resting on the rails of the file drawer. Conventional files are stored parallel to the drawer front. Legal size files are stored perpendicular to the drawer front.

The filing modules shown and described hereinabove eliminate many of the problems of existing hanging folder systems and have a number of advantages in the operation of a filing system. The filing module of the present invention functions as a housing for hanging folders within a file cabinet and provides different sizes for diverse grouping of materials. Because of the modular construction, the filing module can be utilized either as an integral storage device by itself or can be stored within the file cabinet. In addition, the filing module can be used as a portable work station such as on a desk where the contents are active and require frequent transfer. The filing module permits the use of rigid materials and a lock for security. The filing module provides the capacity to file objects other than paper documents. Bar code labels are easily installed on the cover or side panels of the filing module. The file modules can be placed in a normal filing sequence without disrupting other hanging folders in the same drawer and can be interspersed with hanging folders. Also, the filing module can, if desired, be used in a standard file drawer without rails adapted for hanging folders. The large size filing module permits the use of legal size hanging folders within a standard size drawer. The locking option permits security of groups of files within a file drawer, while allowing nonauthorized personnel to have access to other files within the same drawer. The handle arrangements permit quick and easy carrying of the filing module. The files pertaining to a particular subject are held together as a group in the filing module.

While there has been shown and described what is at present considered the preferred embodiments of the present invention, it will be obvious to those skilled in the art that various changes and modifications may be made therein without departing from the scope of the invention as defined by the appended claims.

What is claimed is:

1. A filing module comprising:

a box having a bottom panel, a front panel, a back panel and two end panels, upper portions of said front panel and said back panel extending outwardly beyond each of said end panels to define projections;

a first pair of parallel rods extending between corresponding projections on said front panel and said back panel and spaced to provide supports for hanging folders of a first specified size, said projections having lower edges for resting on rails spaced for receiving hanging folders of said first specified range; and a cover hinged to said front panel and said rear panel by one of said rods for pivoting movement, said filing module being sized and shaped for a placement in a file drawer dimensioned for receiving hanging folders of said specified size.

2. A filing module as defined in claim 1 wherein said cover includes a generally flat top and downwardly extending flanges along its front and rear edges, said one of said rods passing through holes in said flanges.

3. A filing module as defined in claim 1 wherein said end panels terminate below the lower edges of said projections thereby permitting said rods to be used for lifting said filing module.

4. A filing module as defined in claim 1 further including means for locking said cover to said box.

5. A filing module as defined in claim 1 further including a second pair of parallel rods, extending between said end panels and spaced apart to provide supports for hanging folders of a second specified size.

6. A filing module as defined in claim 6 wherein said first specified size is standard size and said second specified size is legal size.

7. A filing system comprising:

a filing cabinet;

at least one file drawer located in said filing cabinet and having parallel rails spaced for receiving hanging folders of a first specified size; and a filing module comprising a box having a bottom panel, a front panel, a back panel and two end panels, upper portions of said front panel and said back panel extending outwardly beyond each of said end panels to define projections;

a first pair of parallel rods extending between corresponding projections on said front panel and said back panel and spaced to provide supports for hanging folders of said first specified size, said projections having lower edges for resting on said rails; and a cover hinged to said front panel and said rear panel by one of said rods for pivoting movement, said filing module being sized and shaped for placement in said file drawer.

8. A filing system as defined in claim 7 wherein said cover includes a generally flat top and downwardly extending flanges along its front and rear edges, said one of said rods passing through holes in said flanges.

9. A filing system as defined in claim 7 wherein said end panels terminate below the lower edges of said projections thereby permitting said rods to be used for lifting said filing module.

10. A filing system as defined in claim 7 further including means for locking said cover to said box.

11. A filing system as defined in claim 7 further including a second pair of parallel rods, extending between said end panels and spaced apart to provide supports for hanging folders of a second specified size.

12. A filing system as defined in claim 11 wherein said first specified size is standard size and said second specified size is legal size.

*13. A filing module comprising:*

*a box having a bottom panel, a front panel, a back panel and two end panels, upper portions of said front panel and said back panel extending outwardly beyond each of said end panels to define projections; and*

*first means, coupled to said box, for supporting hanging folders of a first specified size, said projections having lower edges for resting on rails spaced for receiving hanging folders of said first specified size, said filing module being sized and shaped for placement in a file drawer dimensioned for receiving hanging folders of said specified size.*

*14. A filing module as defined in claim 13 further comprising a cover hinged to said front panel and said rear panel for pivoting movement.*

*15. A filing module as defined in claim 14 wherein said cover includes a generally flat top and downwardly extending flanges along its front and rear edges.*

*16. A filing module as defined in claim 13 wherein said end panels terminate below the lower edges of said projections thereby permitting said first means for supporting to be used for lifting said filing module.*

*17. A filing module as defined in claim 14 further including means for locking said cover to said box.*

*18. A filing module as defined in claim 13 further including a second support means, extending between said end panels and spaced to provide supports for hanging folders of a second specified size.*

*19. A filing module as defined in claim 18 wherein said first specified size is standard size and said second specified size is legal size.*

*20. A filing system comprising:*

*a filing cabinet;*

*at least one file drawer located in said filing cabinet and dimensioned for receiving hanging folders of a first specified size; and*

*a filing module comprising*

*a box having a bottom panel, a front panel, a back panel and two end panels, upper portions of said front panel and said back panel extending outwardly beyond each of said end panels to define projections;*

*first means, coupled to said box, for supporting for hanging folders of a first specified size, said projections having lower edges for resting on rails spaced for receiving hanging folders of said first specified size, said filing module being sized and shaped for placement in said file drawer.*

*21. A filing system as defined in claim 20 wherein said filing module further comprises a cover hinged to said front panel and said rear panel for pivoting movement.*

*22. A filing system as defined in claim 21 wherein said cover includes a generally flat top and downwardly extending flanges along its front and rear edges.*

*23. A filing system as defined in claim 20 wherein said end panels terminate below the lower edges of said projections thereby permitting said means for supporting to be used for lifting said filing module.*

*24. A filing system as defined in claim 22 further including means for locking said cover to said box.*

*25. A filing system as defined in claim 20 further including a second support means, extending between said end panels to provide supports for hanging folders of a second specified size.*

*26. A filing system as defined in claim 25 wherein said first specified size is standard size and said second specified size is legal size.*

*27. A filing module comprising:* a box having a bottom panel, a front panel, a back panel and two end panels, upper portions of said front panel and said back panel extending outwardly beyond each of said end panels to define projections;

*a first pair of parallel rods extending between corresponding projections on said front panel and said back panel and spaced to provide supports for hanging folders of a first specified size, said projections having lower edges for resting on rails spaced for receiving hanging folders of said first specified size;*

*said filing module being size and shaped for placement in a file drawer dimensioned for receiving hanging folders of said first specified size.*

*28. A filing system comprising:*

*a filing cabinet;*

*at least one file drawer located in said filing cabinet and having parallel rails dimensioned for receiving hanging folders of a first specified size; and*

*a filing module comprising:*

*a box having a bottom panel, a front panel, a back panel and two end panels, upper portions of said front panel and said back panel extending outwardly beyond each of said end panels to define projections;*

*a first pair of parallel rods extending between corresponding projections on said front panel and said back panel and spaced to provide supports for hanging folders of said first specified size, said projections having lower edges for resting on said rails; and*

*said filing module being sized and shaped for placement in said file drawer.*

*29. A filing module comprising:*

*a box having a bottom panel, a front panel, a back panel and two end panels, upper portions of said front panel and said back panel extending outwardly beyond each of said end panels to define projections;*

*a pair of parallel support means extending between corresponding projections on said front panel and said back panel and spaced to provide supports for hanging files of a first specified size, said projections having lower edges for resting on rails spaced for receiving hanging folders of said first specified size; and*

*said filing module being sized and shaped for placement in a file drawer dimensioned for receiving hanging folders of said specified size.*

*30. A filing system comprising;*

*a filing cabinet;*

*at least one file drawer located in said filing cabinet and having parallel rails spaced for receiving hanging folders of the first specified size; and*

*a filing module comprising;*

*a box having a bottom panel, a front panel, a back panel and two end panels, upper portions of said front panel and said back panel extending outwardly beyond each of said end panels to define projections;*

*a pair of parallel support means extending between corresponding projections on said front and said back panels and spaced to provide supports for hanging folders of the first specified size, said projections having lower edges for resting on said rails; and*

*said filing module being sized and shaped for placement in said file drawer.*

* * * * *